US010387942B2

(12) United States Patent
Buergi et al.

(10) Patent No.: US 10,387,942 B2
(45) Date of Patent: Aug. 20, 2019

(54) ADAPTIVE COMPONENTS PROVIDING VENDOR-SPECIFIC AND CONTEXT-SPECIFIC INFORMATION TO CUSTOMERS

(71) Applicant: Adobe Inc., San Jose, CA (US)

(72) Inventors: Martin Buergi, Foster City, CA (US); Errol Denger, Scotts Valley, CA (US)

(73) Assignee: Adobe Inc., San Jose, CA (US)

(*) Notice: Subject to any disclaimer, the term of this patent is extended or adjusted under 35 U.S.C. 154(b) by 632 days.

(21) Appl. No.: 14/990,181

(22) Filed: Jan. 7, 2016

(65) Prior Publication Data

US 2017/0200215 A1 Jul. 13, 2017

(51) Int. Cl.
*G06Q 30/00* (2012.01)
*G06Q 30/06* (2012.01)
*G06Q 30/02* (2012.01)

(52) U.S. Cl.
CPC ..... *G06Q 30/0633* (2013.01); *G06Q 30/0259* (2013.01); *G06Q 30/0261* (2013.01); *G06Q 30/0269* (2013.01); *G06Q 30/0631* (2013.01); *G06Q 30/0639* (2013.01)

(58) Field of Classification Search
CPC ..... G06Q 30/06; G06Q 30/0601–0643; G06Q 30/08; G06Q 30/0251–0277
See application file for complete search history.

(56) References Cited

U.S. PATENT DOCUMENTS

2005/0131772 A1* 6/2005 Chow .................... G06Q 30/06 705/26.7
2008/0021767 A1* 1/2008 Benson .................. G06Q 10/00 705/7.29
2014/0201026 A1* 7/2014 Adoni ................ G06Q 30/0631 705/26.7
2017/0180352 A1* 6/2017 Akbarpour .......... H04L 63/0815

OTHER PUBLICATIONS

The mobile commerce value chain: analysis andfuture developments Stuart J. Barnes* International Journal of Information Management. Apr. 2002. (Year: 2002).*

* cited by examiner

*Primary Examiner* — William J Allen
(74) *Attorney, Agent, or Firm* — Kilpatrick Townsend & Stockton LLP

(57) ABSTRACT

Computer-implemented techniques for allowing a vendor to more easily provide shopping experiences with vendor-specific and context-specific information on different devices used by a customer and vendor personnel. One embodiment provides vendor-specific information using a smart list that is sharable with multiple vendors. The smart list is stored on a server and shared with multiple vendors and identifies items that the customer is considering acquiring. The technique involves receiving input from the customer to share the smart list with a vendor and, based on the input, sharing the smart list from the customer device or server with a vendor device of the vendor. The technique identifies vendor-specific information using an item of the smart list that the customer is considering acquiring and provides the vendor-specific information to the customer or a vender support person.

16 Claims, 9 Drawing Sheets

ADAPTIVE COMPONENTS PROVIDING VENDOR-SPECIFIC AND CONTEXT-SPECIFIC INFORMATION TO CUSTOMERS

FIELD

This disclosure relates generally to computer-implemented methods and computer-readable medium relating to providing sales information to customers and others on multiple computing devices in multiple contexts from multiple vendors.

BACKGROUND

In order to reach potential customers, vendors seek to provide software applications and services that make shopping an easier, more pleasant experience for the customers. The software generally attempts to provide each customer with enough information to encourage a sale but without overwhelming the customer with extra information. Ideally the information provided to the customer is customized based on a vendor's information about the customer's characteristics and preferences. A vendor's information about a customer is generally stored in a vendor-specific customer profile. Each vendor maintains its own database with customer profile information and does not share this information with other vendors. This makes it difficult for a vendor who has not had previous contact with a particular customer to provide an experience that is tailored for that customer. Similarly, the lack of sharing of customer information makes it more difficult for a customer to interact with multiple vendors. For example, a customer attempting to maintain multiple wish lists with multiple vendors is required to manually manage and synchronize the wish lists and, in order to comparison shop, must manually identify products offered by different vendors corresponding to the types of products that the customer is interested in. In sum, existing techniques do not adequately facilitate the sharing of customer information amongst multiple vendors to facilitate a customer's experience with multiple vendors or an individual vendor's ability to customize an experience based on sharable customer information.

In addition, vendors must develop and maintain different applications, webpages, other content-providing software, as well as in-store applications for the variety of different contexts. For example, the different applications must account for different device form factors (e.g., on small-screened mobile device apps, webpages on large-screened computers, in-store devices, etc.), as well as for the different services to be provided to the customer. Developing and maintaining these multiple systems is complex and expensive. Typically, a vendor is required to create, update, and manage individual software for each different context. Existing techniques do not adequately facilitate a vendor's ability to provide webpages, apps, in-store applications, and other offerings that provide customized customer experiences for different customer contexts.

SUMMARY

Disclosed are techniques for allowing a vendor to more easily provide shopping experiences with vendor-specific and context-specific information on different devices used by a customer and vendor personnel. One embodiment provides vendor-specific information using a smart list that is sharable with multiple vendors. The smart list is shared with multiple vendors and identifies items that the customer is considering acquiring. The technique involves receiving input from the customer to share the smart list with a vendor and, based on the input, sharing the smart list from the customer device or server with a vendor device of the vendor. The technique identifies vendor-specific information using an item of the smart list that the customer is considering acquiring and provides the vendor-specific information to the customer or a vender support person.

Another embodiment provides a method for providing differing sales information using an adaptive component based on the context of the shopping experience. The technique configures an adaptive component to selectively receive and present information from a back-end service based on the context of shopping experience on a particular device, in a particular location, or indicating a particular stage of interest in a product or service. The adaptive component has configured parameters specifying different sets of sales information for different contexts. The technique provides different sets of context-specific sales information on different devices via the adaptive component. For different contexts, the adaptive component identifies the context, identifies the corresponding set of context-specific sales information to retrieve based on the context and the adaptive component configured parameters, retrieves the set of context-specific sales information from the back-end service, and provides the set of context-specific sales information for presentation.

The embodiments of the invention discussed in this summary are provided as examples to introduce the subject matter of the invention and are not intended to limit the scope of the invention. Additional embodiments and examples of the invention are provided in the detailed description and figures.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
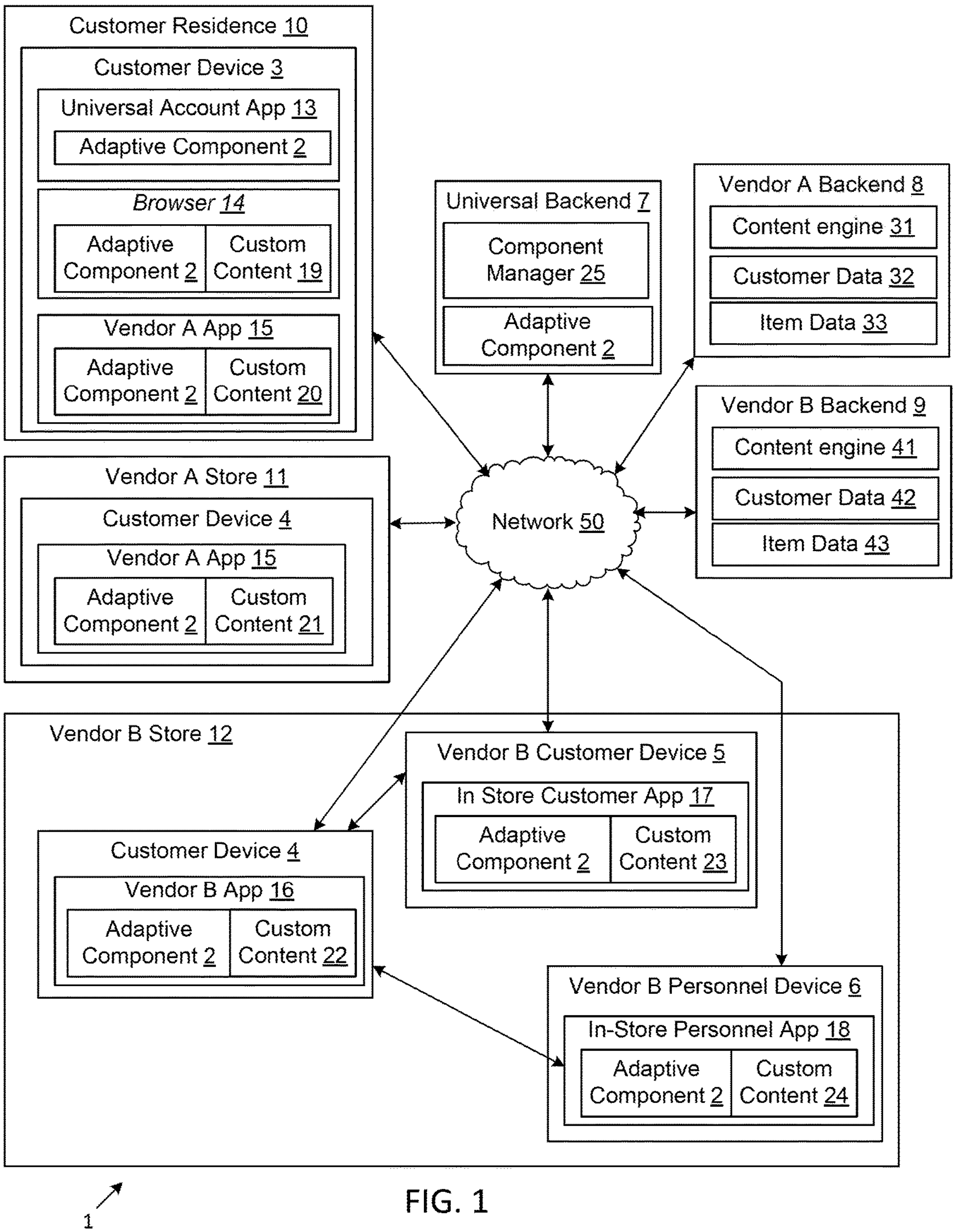
FIG. 1 is a drawing of a networked environment for implementing an adaptive component such as a smart list according to one embodiment of the invention.

As discussed above, existing techniques do not adequately facilitate the sharing of customer information amongst multiple vendors to facilitate a customer's experience with multiple vendors. Existing techniques also do not adequately facilitate an individual vendor's ability to customize a customer's experience based on shared customer information. These problems are addressed by providing an adaptive component, such as a smart list, that is sharable with multiple vendors and configured to provide vendor-specific and/or context specific shopping experiences on different devices used by a customer or vendor personnel.

One embodiment provides vendor-specific information using a smart list that is sharable with multiple vendors. The smart list includes customer information similar to a customer wish list, such as items identified by the customer that the customer is considering acquiring. The smart list is stored on a universal server that is not specific to any one vendor. When the customer wants to interact with a vendor, the customer is able to share the smart list with the vendor and the vendor provides custom content in response. In one example, a customer shares a smart list identifying a list of products the customer wants to buy (e.g., tennis shoes, a tennis racquet, and a tennis bag) and the vendor provides vendor-specific information to make the customer's shopping experience with the vendor better than it otherwise would be. In the above example, the vendor (Vendor A) identifies suggested Vender A brand tennis shoes, Vender A brand tennis racquet, and a promotion that includes a free tennis bag with purchase of the Vender A brand tennis racquet.

Adaptive components of one embodiment of the present invention are additionally or alternatively configured to provide context-specific information. As discussed in the Background above, existing techniques do not adequately facilitate a vendor's ability to provide webpages, apps, in-store devices, and other offerings that provide customized customer experiences for different customer contexts. The problem is addressed using adaptive components that allow a vendor to more easily provide shopping experiences with context-specific information for different customer contexts. When implemented in a computing device, the adaptive component is configured to selectively receive and present information from a back-end service. The adaptive component is implemented as part of a mobile device app, functionality within a webpage, a plugin added to a webpage, a widget, or any other content-providing component. The adaptive component is adaptive in that it is configured, for a vendor or third-party, to provide different information in different contexts. The particular information presented to the customer by the adaptive component are configurable during development and configured to be dependent upon the context of the shopping experience on a particular device, in a particular location, at a particular stage of interest in a product or service, and/or other possible characteristics.

Once deployed on customer computing devices, an adaptive component detects the context of the customer's shopping experience, then identifies a set of context-specific sales information to retrieve based on the context and the configured parameters of the adaptive component. Thereafter, the adaptive component retrieves the identified context-specific sales information from the back-end service and presents the information to the customer via his/her computing device, such as a smartphone or other mobile device, desktop computer, etc. Subsequently, the adaptive component detects a different context and identifies another set of context-specific sales information to retrieve based on the different context and the configured parameters of the adaptive component. The adaptive component then retrieves the other context-specific sales information from the back-end service and presents this information to the customer via the same or a different computing device than was used for the earlier presentation.

One embodiment herein provides an adaptive component that provides context-specific content based on information the customer's prior actions, customer location, customer input providing indications of where the customer is in the shopping cycle, and customer segment or buyer role. In one specific example, a vendor configures the adaptive component to provide broad information to new customers who have not previously expressed interest, to provide detailed information to returning customers identifying a previously viewed product, and provide store specific information to customers entering a store. In another embodiment, a vender is able to define its own customer shopping cycle stages, criteria for a customer to fall within the stages, and information to be provided by the adaptive component based on the stage of the shopping cycle.

The use of customer segment or buyer role can involve various scenarios. One example involves tailoring experiences based a customer's segment or persona (e.g., bargain-hunters, information seekers, visual shoppers, fashionistas, etc.), each of which exhibit unique behaviors and information requirements. Another example involves tailoring an application to accommodate multiple participants that are either supporting or part of a shopping experience. In one embodiment this is implemented in business-to-customer ("B2C") marketing, by tailoring the experience of a store associate (using a clienteling application) or a call center representative. In another embodiment, this is implemented in a business-to-business contact in which the experiences of a field engineer (requiring technical information to make a purchase) and the corresponding manager or procurement officer (requiring other information such as volume discounts or delivery terms) are appropriately tailored.

The techniques for configuring and using smart lists and other adaptive components described herein are advantageous over prior techniques in several ways. Prior techniques generally required that vendors create individual software for different contexts. This problem is addressed by configuring an adaptive component to determine the context in which it is used and to provide varying content based on the context. For example, the content may be customized based on where the customer is in the shopping cycle (e.g., showing no interest, initial interest, requesting information, seeking additional information, comparing products, visiting a store, etc.). Prior techniques also did not facilitate use of a customer's wish list and other customer information with multiple vendors. This problem is addressed by creating sharable adaptable components that are stored on a customer's device or a vendor-independent server and shared with any vendor the customer chooses.

As used herein, "sales information" (also referred to as "item information") refers to various possible information directed to facilitating the sale of an item or service and/or related items or services. The sales information can be general information about an item itself and/or related items, as well as information about a vendor's offering of the particular item. For example, the sales information can include an item description/specifications, images, audio/video, ratings/reviews, prices, promotions, nearby stores/vendors offering the item, inventory levels in the stores, etc.

As used herein, a "customer" refers to an individual who visits or interacts with a vendor regarding a purchase or possible purchase of a product or service from the vendor. A customer can interact with a vendor by visiting a physical store of the vendor or by interacting electronically with a vendor server or other device, for example, by using the vendor's website.

As used herein, a "vendor" refers to an individual or business that offers products and services for sale to one or more customers. In one example, a vendor sells products and/or services only online. In another example, a vendor sells products and/or services only in physical stores. In another example, a vendor sells products and/or services both online and in physical stores.

As used herein, a "customer device" refers to any computing device in which an adaptive component is executed or otherwise used, which can include computing devices not owned by the customer of the adaptive component, such as displays in a physical store of a vendor.

As used herein, "sharable" refers to an adaptive component such as a smart list being configured to be electronically transferred through a network from one electronic device to another electronic device with multiple vendors.

As used herein, "vendor-specific information" refers to information that is determined based on a particular information. One example of vendor-specific information is sales literature specific to a particular vendor's brand of product. Another example of vendor-specific information is information regarding a particular vendor's promotion regarding a product identified on a customer's smart list.

As used herein, an "adaptive component" refers to executable code or other electronic content that is configurable with parameters to receive and present information from a back-end service. An adaptive component stores customers-specific information that is sharable with multiple vendors in one embodiment. In another embodiment, an adaptive component is configured to provide information based on the vendor or context of the shopping experience.

As used herein, "context of the shopping experience" refers to the circumstances, both historical and current, under which a customer is considering one or more items to be acquired. The circumstances can include, for example, a particular computing device with which the customer is considering the item, the location of the computing device, and/or indicators of interest expressed in the items or related items.

As used herein, "back-end" and back-end service" refer to a data processing resources executed in a computing environment. The back-end service can provide access to data resources that are maintained in the computing environment, as well as external data resources, such as data resources of vendors.

As used herein, a "stage of interest in a product or service" is a classification of a customer's expressed interest in a product or service based upon various indicators of interest. The classifications and the various indicators of interest associated with the classifications can be defined as parameters for the adaptive components. The indicators of interest for a particular customer can include searches performed for the product or service by the customer, descriptions/specifications reviewed by the customer for the product or service, ratings/reviews left for the product or service by the customer, past purchases of the product or service by the customer, placement of the item or service into a virtual shopping cart in preparation for a purchase by the customer, etc.

As used herein, a "smart list" refers to a particular implementation of an adaptive component that manages a list of items or services considered for acquisition by a customer and enables the provision of context-specific information about individual items or services offered by vendors, including information tailored to the respective vendors.

FIG. 1 is a drawing of a networked environment 1 for implementing an adaptive component 2 such as a smart list according to one embodiment of the invention. The networked environment 1 includes a customer device 3, another customer device 4, a Vendor B customer device 5, a Vendor B personnel device 6, a universal backend 7, a Vendor A backend 8, and a Vendor B backend 9. The devices interact with one another through network 50 and/or through direct device-to-device communications. The network 50 includes, for example, the Internet, intranets, extranets, wide area networks (WANs), local area networks (LANs), wired networks, wireless networks, or other suitable networks, etc., or any combination of two or more such networks. For example, such networks may comprise satellite networks, cable networks, Ethernet networks, and other types of networks.

Various types of adaptive components 2 are possible. Examples of adaptive components include, but are not limited to, product information components, smart list components, product comparison components, virtual shopping cart components, search components, and customer help components. Such adaptive components are also alternatively referred to as "smart" components because they are configured to be "smart" enough to recognize context and provide context-specific or vendor-specific information.

The exemplary networked environment of FIG. 1 is presented to illustrate various exemplary potential interactions using an adaptive component. In this example, customer device 3 is located at customer residence 10. Also in this example, customer device 4 is located at Vendor A store 11 in one circumstance and at Vendor B store 12 in another circumstance. Vendor B customer device 5 and Vendor B personnel device 6 are located at Vendor B store 12 and are owned and operated by Vendor B.

In one example, the customer uses a universal account app 13 on customer device 3 to interact with component manager 25 on universal backend 7 to create and manage a sharable adaptive component. In one example, the customer creates an adaptive component 2 that is a smart list by entering user profile information (name, address, age, gender, already-owned products, etc.) and identifying one or more items or services that the customer desires to acquire. The items are identified generically (e.g., golf clubs) or using vendor/brand-specific information (e.g., Brand X golf clubs). The smart list in this example is stored both on the universal backend 7 and locally on the customer device 3. Thereafter, as the customer visits virtual and physical stores of different vendors, the smart list (i.e. the smart list implementation of the adaptive component 2) obtains and presents context-specific information about one or more of the items offered by the respective vendors, including information tailored to the respective vendors.

Continuing the above example, the customer uses the smart list adaptive component to interact with multiple vendors. The customer uses browser 14 to shop on a website provided by Vendor A Backend 8. In this example, the vendor website uses the adaptive component 2 (the smart list in this example) as a plugin to a webpage that it provides. The adaptive component 2 (smart list) is executed as a plugin and sends information to the content engine 31, which uses customer data 32 such as past purchase information for the customer and vendor item data 33 to provide custom content 19 with vendor specific information on the webpage that the customer views using browser 14. This involves selecting an appropriate product (e.g., a particular Vendor A brand product) and selecting appropriate information (e.g., high level or detailed product information) about the particular product to provide as the custom content 19. In one example, the custom content 19 is identified regarding the Vendor A brand product by the content engine 31 based on the product corresponding to a type of product on the adaptive component 2 (smart list) and based on the customer data 32 identifying that the customer had previously shopped for Vendor A brand products and is far along in the shopping experience for the product.

The vendor-specific information can include current promotions, customer history for the customer, locations/quantities of items in a vendor's nearby store, and/or other possible information for respective vendors. Using the vendor-specific information, the adaptive component 2 provides more tailored item information for a given context and better recognition of the context than existing applications, while also maintaining confidentiality of vendor-specific information from other vendors, if needed.

The customer also uses a Vendor A app 15 on the customer device 3 to shop using information from Vendor A Backend 8. In this example, the Vendor A app 15 uses the adaptive component 2 (smart list) to receive custom content 20. The custom content 20 is identified by the content engine 31 based on the adaptive component 2 being executed as a plugin or otherwise within the vendor A app 15.

The customer also visits a physical store, Vendor A store 11, and uses the vendor A app 15 on customer device 4 to interact with vendor A backend 8 to shop with Vendor A. In this example, the Vendor A app 15 uses the adaptive component 2 (smart list) to receive custom content 21. The custom content 21 is identified by the content engine 31 based on the adaptive component 2 being executed as a plugin or otherwise within the vendor A app 15. In one embodiment, the custom content 21 (on customer device 4 in store 11) differs from the custom content 20 (on device 3 at the customer residence 10) based on the different contexts. In one example, custom content 20 identifies multiple nearby store options and custom content 21 identifies stock levels and floor layout information specific to the visitor store A.

The customer also visits Vendor B store 12 and uses the customer's own device (customer device 4) and the vendor's in-store customer device 5. In this example, the customer uses the vendor B app 16 on customer device 4 to interact with vendor B backend 9 to shop with Vendor B. For example, the customer desires to pull up the adaptive component 2 to review items on the smart list while walking around Vendor B store 12 to see information about items on the smart list are available in the Vendor B store 12. In this example, the Vendor B app 16 uses the adaptive component 2 to communicate with Vendor B backend 9 to receive custom content 22, such as information about where particular items of the adaptive component 2 are found in the store. The custom content 22 also includes information about store specific sales and other store-specific information. Vendor B backend 9 includes a content engine 41 that identifies the custom content 22 using customer date 42 and item data 43.

While in the vendor B store 12, the customer also uses vendor B customer device 5. For example, vendor B provides a touch screen product information device in the vendor B store 12 to allow customers to search for items and order items not available in the vendor B store 12 for delivery or subsequent pickup. In this example, the customer uses the in-store customer app 17 on Vendor B customer device 5 to interact with vendor B backend 9 to shop with Vendor B. In this example, the in-store customer app 17 uses the adaptive component 2 to communicate with Vendor B backend 9 to receive custom content 23, for example, content identifying items corresponding to those on identified by adaptive component 2 (smart list) that are on sale. The adaptive component 2 (smart list) in one example is shared directly from the customer device 4 to the vendor B customer device 5, for example, via Bluetooth or local area network. In another example, the adaptive component 2 is shared by the customer sending a message to the universal backend 7, which provides the adaptive component 2 to the vendor B customer device 5 through network 50.

While in vendor B store 12, the customer also interacts with vendor personnel such as a sales associate assisting the customer with finding products to purchase. To enable the vendor sales associate to provide better assistance, the customer shares the adaptive component 2 (smart list) with the vender B personnel device 6 operated by the sales associate via a direct link or by instructing the universal backend 7 to share the smart list adaptive component 2. The in-store personnel app 18 on the vender B personnel device 6 uses the smart list adaptive component 2 to interact with vendor B backend 9 to provide custom content 24 to the sales associate. The sales associate, for example, receives information about the items the customer would like to acquire identified from the smart list, information about Vendor B product options to sell to the customer, and information about the customer from customer data 42.

Figure 2:
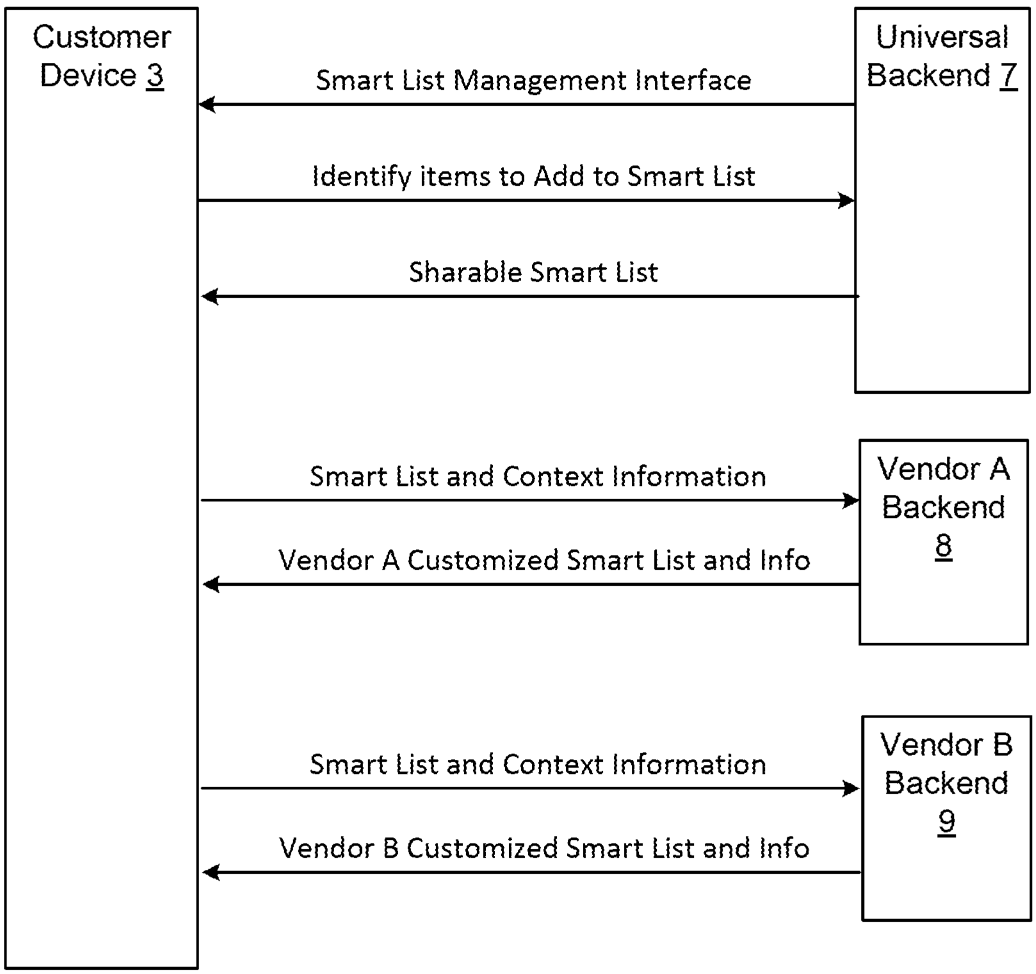
FIG. 2 is a flow chart illustrating an exemplary use of a smart list.

FIG. 2 is a flow chart illustrating an exemplary use of a smart list. In this example, the process begins with universal backend 7 providing a smart list management interface to customer device 3. The customer uses the interface to identify items to add to the customer's smart list. A message is sent from the customer device 3 to the universal backend 7 with this item information for the smart list. The universal backend 7 then sends a sharable smart list to the customer device that includes identified items that the customer desires to acquire.

Next the customer uses the smart list to shop with vendor A. Specifically, the customer device 3 accesses the vendor A website and sends the smart list and context information to the vendor A backend 8. The context information, in this example, identifies the type of device the user is using, the user's location, and other context-specific information. The vendor A backend 8 then uses this information to send a Vendor A customized smart list and other vendor-specific information to the customer device 3, where the customized smart list and other information is displayed to the user, for example, as part of Vendor A's website webpages.

Next the customer uses the smart list to shop with vendor B. Specifically, the customer device 3 sends the smart list and context information to the vendor B backend 9. The vendor B backend 9 then uses this information to send a Vendor B customized smart list and other vendor-specific information to the customer device 3, where the customized smart list and other information is displayed to the user.

In this way, the user is able to use his or her smart list with multiple vendors without having to maintain separate wish lists with each vendor. In addition, the vendors are able to provide vendor-specific promotions and information and use information from their own customer records to provide a customer experience that is convenient for the customer and best targeted to the customer.

Figure 3:
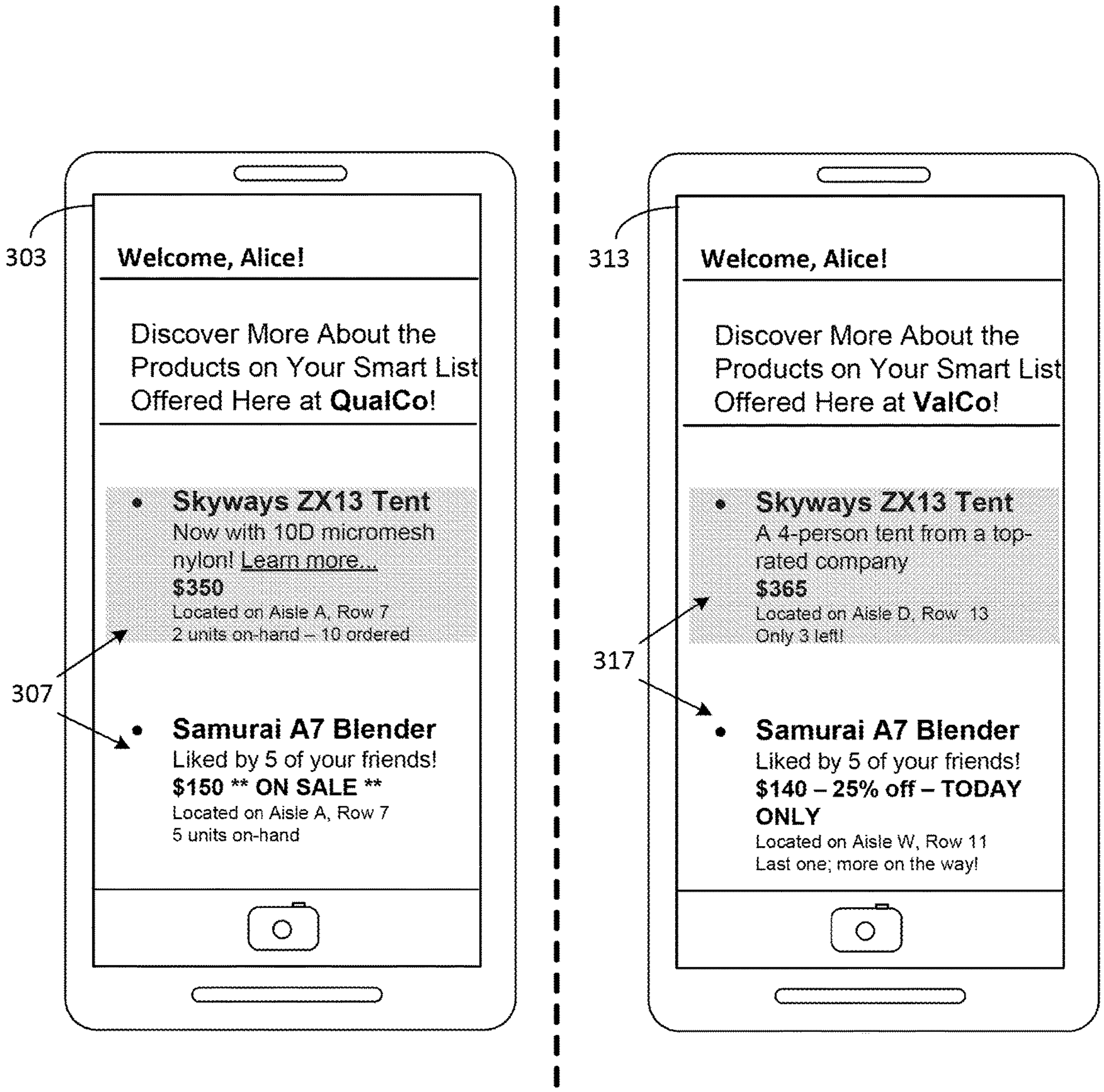
FIG. 3 is a pictorial diagram of an exemplary customer interface of one embodiment of the invention.

In FIG. 3, the customer device is shown with two different vendor-specific presentations 303 and 313 associated with a particular customer's list of items for the smart list. The presentation 303 is associated with the vendor QualCo based on the context of the customer device being in close proximity to a QualCo store, a customer preference, and/or other possibilities. The presentation 303 includes context-specific sales information 307 for two items on the customer's smart list that are offered by QualCo, a particular tent and blender. As a part of the retrieval of the historical context for the list items, the smart list obtains a customer history related to the items from QualCo. Since, in this example, the customer has a historical context with QualCo that demonstrates expertise with tents, the smart list determines that technical specifications (e.g. "10D micromesh nylon") and/or other information suitable for customers who are tent experts will be included for this particular item. However, since the customer does not have any relevant historical context with QualCo for blenders, the smart list determines that only general sales information 307 will be shown in the presentation 303, such as the number of friends or other customers who have a positive sentiment about the blender, basic features, etc. In addition, the smart list obtains other context-specific sales information 307 from QualCo related to the items, such as the current price, any promotions, location of the items within a nearby QualCo store, inventory on-hand at the QualCo store, etc.

On the other hand, at a different point in time, the same customer device is in proximity to a ValCo store, thereby providing the context in which the presentation 313 is generated that is related to the items of the smart list that are offered by ValCo. As a part of the retrieval of the historical context for the smart list items, the smart list also obtains a customer history related to the items from the vendor, ValCo. Since, in this example, the customer does not have a historical context with ValCo that demonstrates any particular knowledge of tents, the smart list determines that only general sales information 317 will be shown in the presentation 313, such as a basic feature or description of the tent. Similarly, since the customer does not have any relevant historical context with ValCo for blenders, the smart list determines that only general sales information 317 will be shown in the presentation 313, such as the number of friends or other customers who have a positive sentiment about the blender, basic features, etc. In addition, the smart list obtains other context-specific sales information 317 from ValCo related to the items, such as the current price, any promotions, location of the items within a nearby ValCo store, inventory on-hand at the ValCo store, etc. In various embodiments, the smart list provides the list of items to the vendor device of the vendor associated with the current context (e.g. a vendor whose store is nearby). Thereafter, the vendor provides the smart list with relevant vendor-specific information, such as customer history, item locations, inventory levels, etc. In some implementations, context-specific presentations, such as those represented in FIG. 3, are the result of contextual changes other than a change in the vendor. For instance, a particular customer can share the items of his smart list to be duplicated by another customer. While visiting the same vendor, the presentations for the smart list items of the respective customers could then be different based upon the differences in the context of the customers themselves (e.g. customer histories show one customer is a tent expert, while the other is not).

Figure 4:
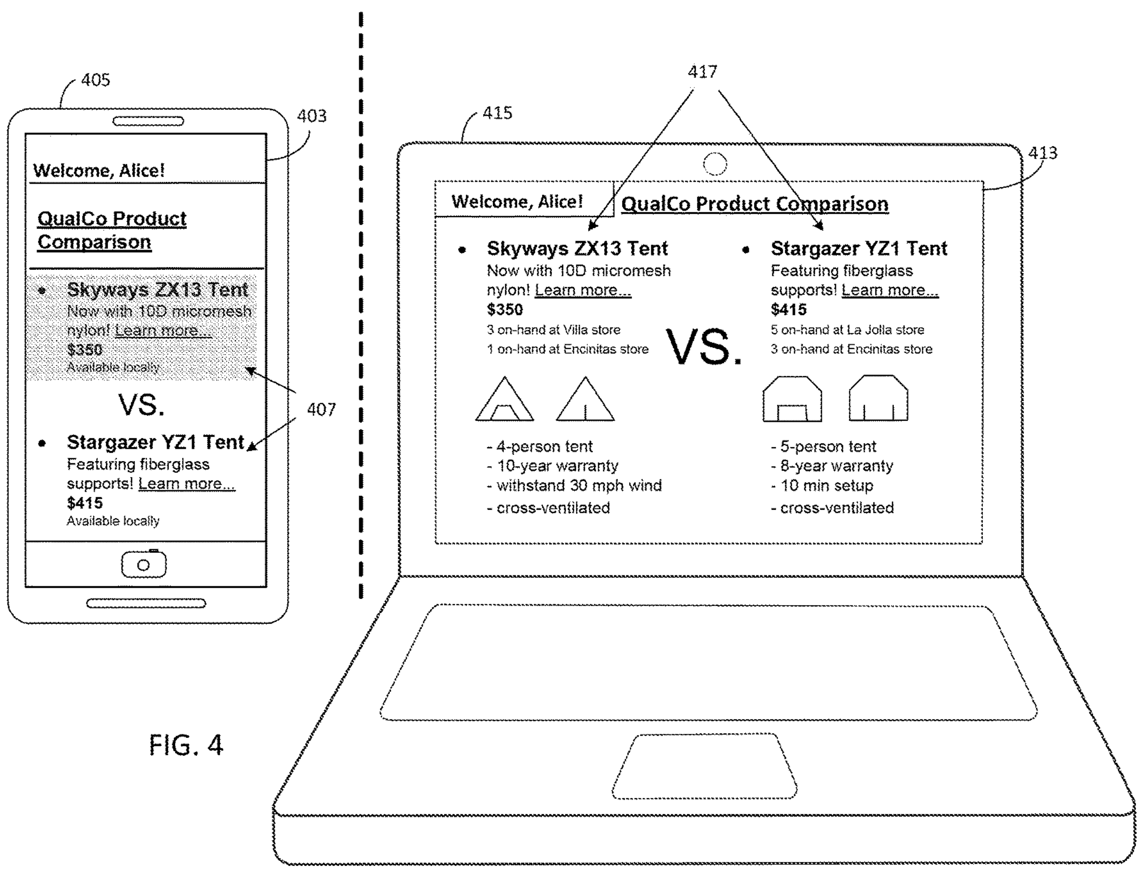
FIG. 4 is a pictorial diagram of another exemplary customer interface of one embodiment of the invention.

Referring next to FIG. 4, shown is an exemplary illustration of adaptive components providing product comparison functionality. The product comparison is implemented in two different types of customer devices 405 and 415 shown with two different presentations 403 and 413 associated with a particular customer's product comparison for the vendor QualCo. As discussed previously, the selection of QualCo as the vendor may be made based on the location of the customer devices, a customer preference, a configured parameter of the adaptive components, and/or other possible bases.

As with the smart list and other implementations of the adaptive components, the context-specific item information 407 shown in the presentation 403 are based in part upon the current and historical context for the particular customer, including any vendor-specific information. In addition, the particular item information 407 selected by the adaptive component is also based upon the capabilities of the customer device. For example, given limitations of the customer device 405, such as a small screen size, the context-specific item information 407 selected by the adaptive component to be shown in the presentation 403 can be pared down to include a brief description, the price, and availability at the respective vendor, QualCo. On the contrary, given the increased capability of the customer device 415, such as a larger screen size, the adaptive component can select additional information to be shown in the context-specific item information 417. For example, the item information 417 includes images for each product, additional product specifications, inventory levels at various nearby stores.

In some embodiments, the presentation produced by the adaptive component varies not only based on the type of computing device, but also based on whose computing device is used. In one example, a customer in a physical store of QualCo uses a tablet computing device to display a product comparison of two different clothing items. If the customer approaches a salesperson for assistance, the adaptive component is shared with a tablet or other computing device of a salesperson using BLUETOOTH, WI-FI, etc. In one embodiment, the context-specific item information presented by the adaptive component to the customer is different than the context-specific information presented by the adaptive component to the salesperson. For instance, the customer's information may include clothing sizes that they do not wish to share, while the item information for the salesperson may include warehouse inventory information that is not be presented to the customer.

Figure 5:
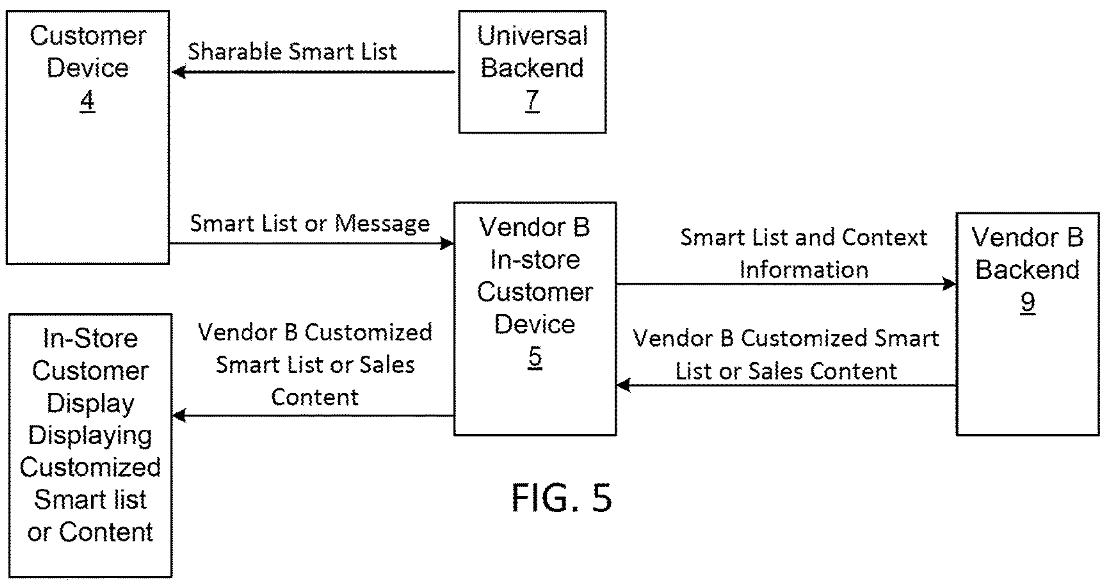
FIG. 5 is a flow chart illustrating another exemplary use of a smart list using an in-store device.

FIG. 5 is a flow chart illustrating another exemplary use of a smart list using an in-store device. In this example, the process begins with the universal backend 7 sending a sharable smart list with a customer device 4 while the customer is in vendor B store 12. The customer uses the customer device 4 to cause the smart list to be sent to the vendor B in-store customer device 5. For example, the customer may select a share option on the vender B app and identify a unique number associated with the vendor B in-store customer device 5. On one example, the customer device 3 sends the smart list directly to the vendor B in-store customer device 5. In another example, the customer device sends an authorization message to the vendor B customer device 5 that is used to retrieve the smart list from another network location. Once the vendor B customer device 5 has obtained the smart list it sends the smart list and content information to vendor B backend 9 and receives vendor B customized smart list or sales content that is presented on an in-store customer display.

Figure 6:
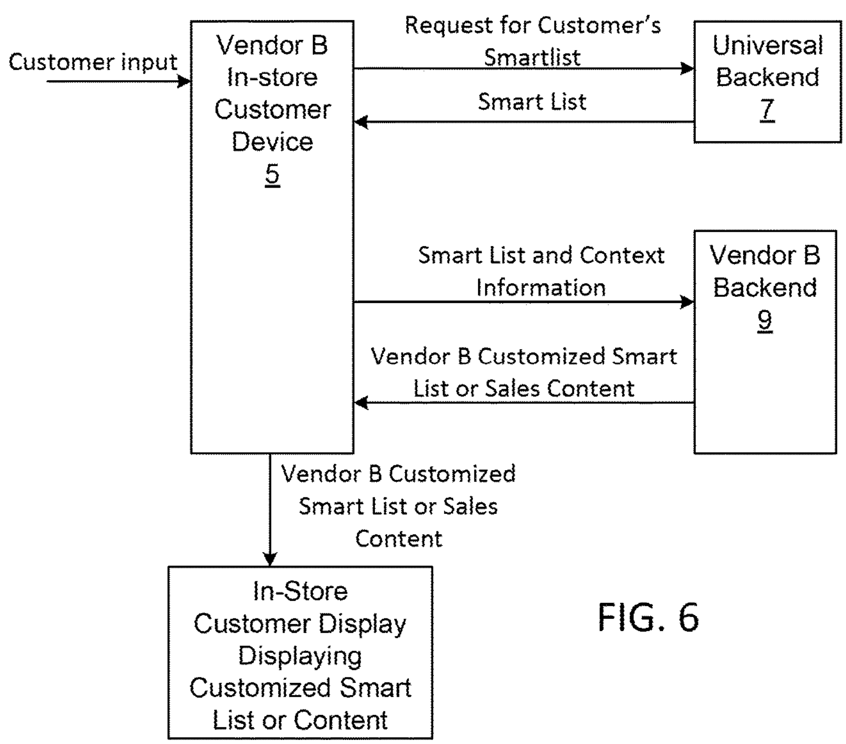
FIG. 6 is a flow chart illustrating another exemplary use of a smart list using an in-store device.

FIG. 6 is a flow chart illustrating another exemplary use of a smart list using an in-store device. In this example, the process begins with customer input received at vendor B in store customer device 5. For example, the customer may use a keyboard or touch screen to interact with a vendor-provided kiosk within the vendor B store 12. The customer enters customer identifying information and a password to gain authorization to share the customer smart list. Once the customer has authorized sharing of the smart list, the vendor B in-store device 5 sends a request for the customer's smart list to the universal backend 7 and receives the smart list. The vendor B in-store device 5 then sends the smart list and context information (e.g., identifying that the customer is in the Vendor B store 12) to vendor B backend 9. The Vendor B backend 9 uses the smart list and context information to identify and/or compose Vendor B customized smart list or sales content that is sent to the vendor B in-store customer device 5, where it is presented on an in-store customer display.

Figure 7:
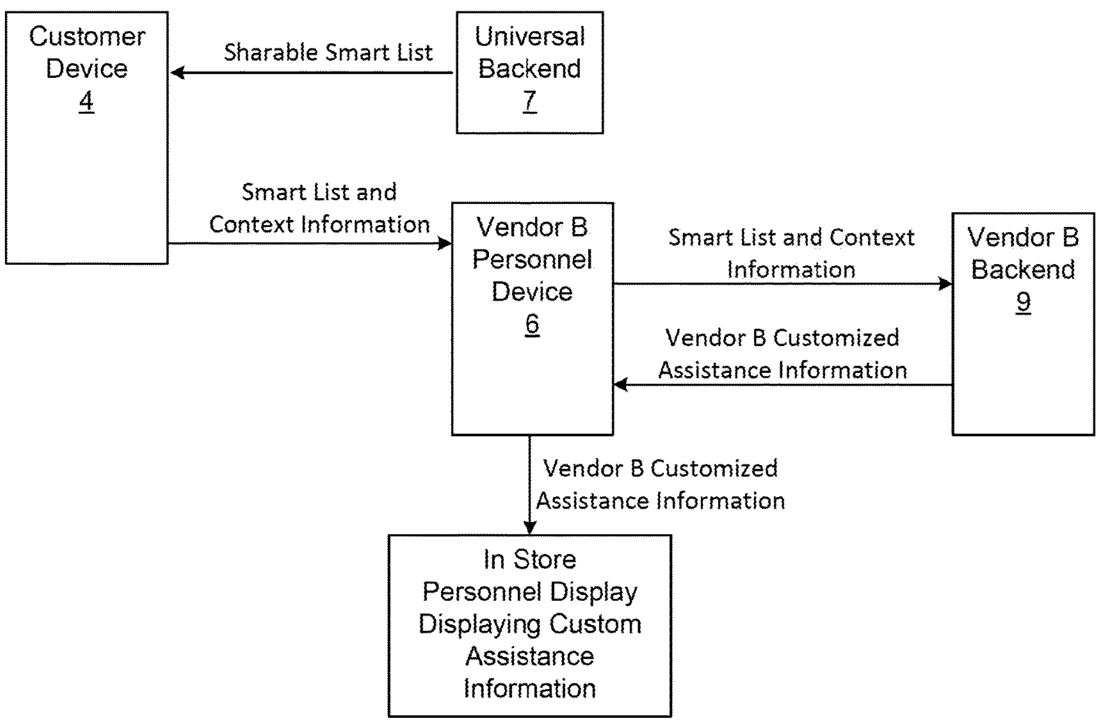
FIG. 7 is a flow chart illustrating an exemplary use of a smart list by vendor personnel using an in-store device.

FIG. 7 is a flow chart illustrating an exemplary use of a smart list by vendor personnel using an in-store device. In this example, the process begins with a customer receiving the sharable smart list from universal backend 7 at customer device 4. The customer then goes to the Vendor B store 12 and talks with a sales associate. The sales associate asks the customer to share the smart list to enable the sales associate to provide better service and the customer uses customer device 4 to send the smart list and context information to the vendor B personnel device 6 used by the sales associate. The vendor B in-store device 5 then sends the smart list and context information (e.g., identifying that the customer is in the Vendor B store 12) to vendor B backend 9. The Vendor B backend 9 uses the smart list and context information to identify and/or compose Vendor B customized smart list or sales content that is sent to the vendor B in-store customer device 5, where it is presented on an in-store customer display.

Figure 8:
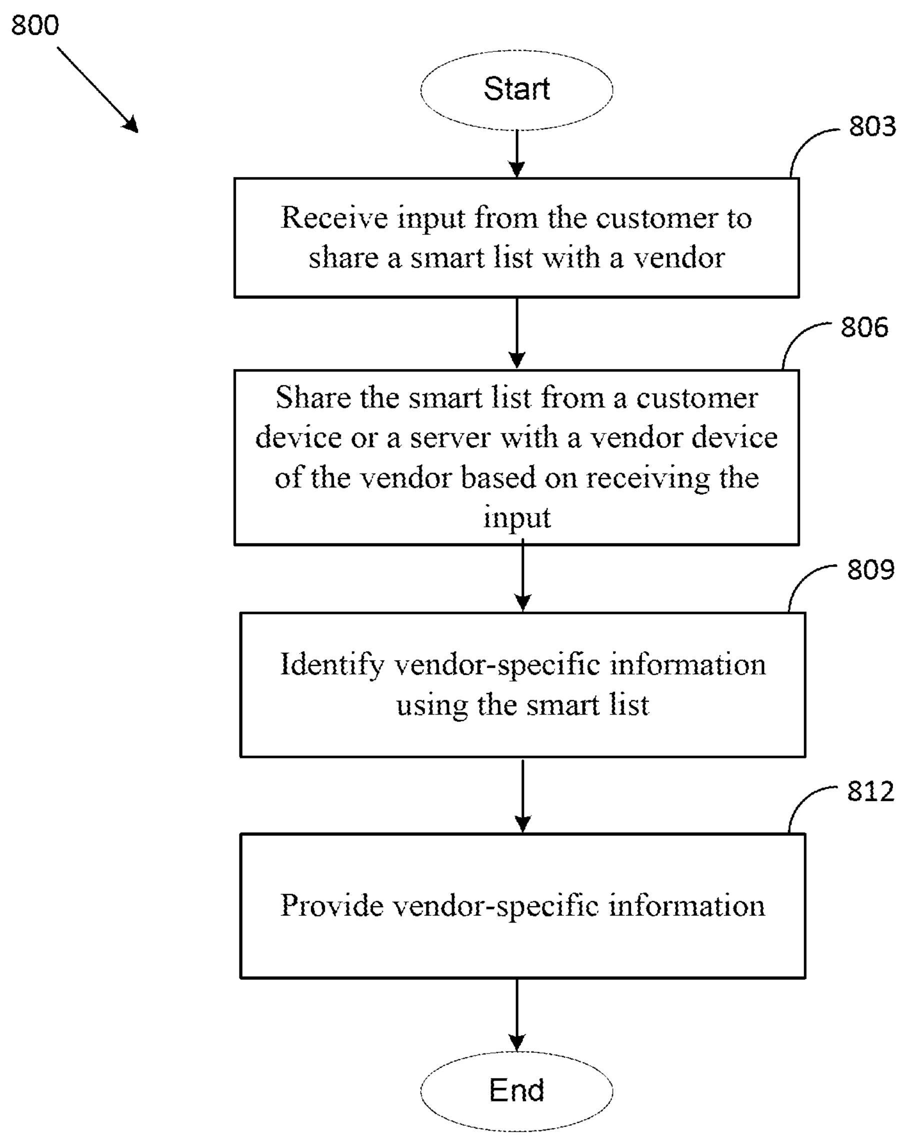
FIG. 8 is a flow chart illustrating a method for providing vendor-specific information using a smart list that is sharable with multiple vendors.

FIG. 8 is a flow chart illustrating a method 800 for providing vendor-specific information using a smart list that is sharable with multiple vendors. Method 800 begins with receiving input from a customer to share a smart list with a vendor, as shown in block 803. The smart list is stored on a server and shared with multiple vendors. The smart list also includes items or services identified by the customer that the customer is considering acquiring. A smart list is created by the customer in any suitable way. In one example, the user creates a smart list by converting a private (one vendor) smart list to a universal smart list for multiple vendors. In another example, a user creates a smart list using a universal smart list provider and interacts with vendors (and any other third parties) that are authorized to view and/or modify the smart list based on customer authorizations.

Method 800 next involves sharing the smart list from a customer device or a server with a vendor device of the vendor based on receiving the input, as shown in block 806. In one example, the sharing is from the customer device to the vendor device physically located in a store of the vendor. In another example, the sharing is with a vendor server that the customer interacts with online, for example, using the vendor's website. In certain instances, the smart list includes both private customer information and sharable customer information. In such instances, sharing the smart list involves sharing the sharable customer information without sharing the private customer information with the vendor. This protects the customer's privacy. In one embodiment, a customer designates information items and profile information on the customer's smart list as sharable or private. For example, a customer designates clothing size of items on a smart list to be private but the items themselves to be sharable.

Method 800 next involves identifying vendor-specific information using the smart list, as shown in block 809. In one example, the vendor-specific information identifies or promotes a vendor item corresponding to an item of the smart list that the customer is considering acquiring. In one specific embodiment, this involves identifying a type of the item of the smart list that does not identify a brand, determining a brand of an item offered by the vendor of the item type, and determining product information regarding the brand of the item offered by the vendor to include in the vendor-specific information.

The vendor-specific information, in another example, is based on additional customer information maintained by the vendor. A specific example of this involves identifying customer information maintained by the vendor and determining the vendor-specific information to provide based on the item and the customer information.

The vendor-specific information is also customized based on other context information in one embodiment. In one example, vendor-specific information includes context-specific information determined based on the customer being physically located in the store of the vendor.

Method 800 next involves providing the vendor-specific information, as shown in block 812. The information is provided on a customer device in one embodiment. In another embodiment, the information is provided on a vendor device, for example, located in a store of the vendor.

Figure 9:
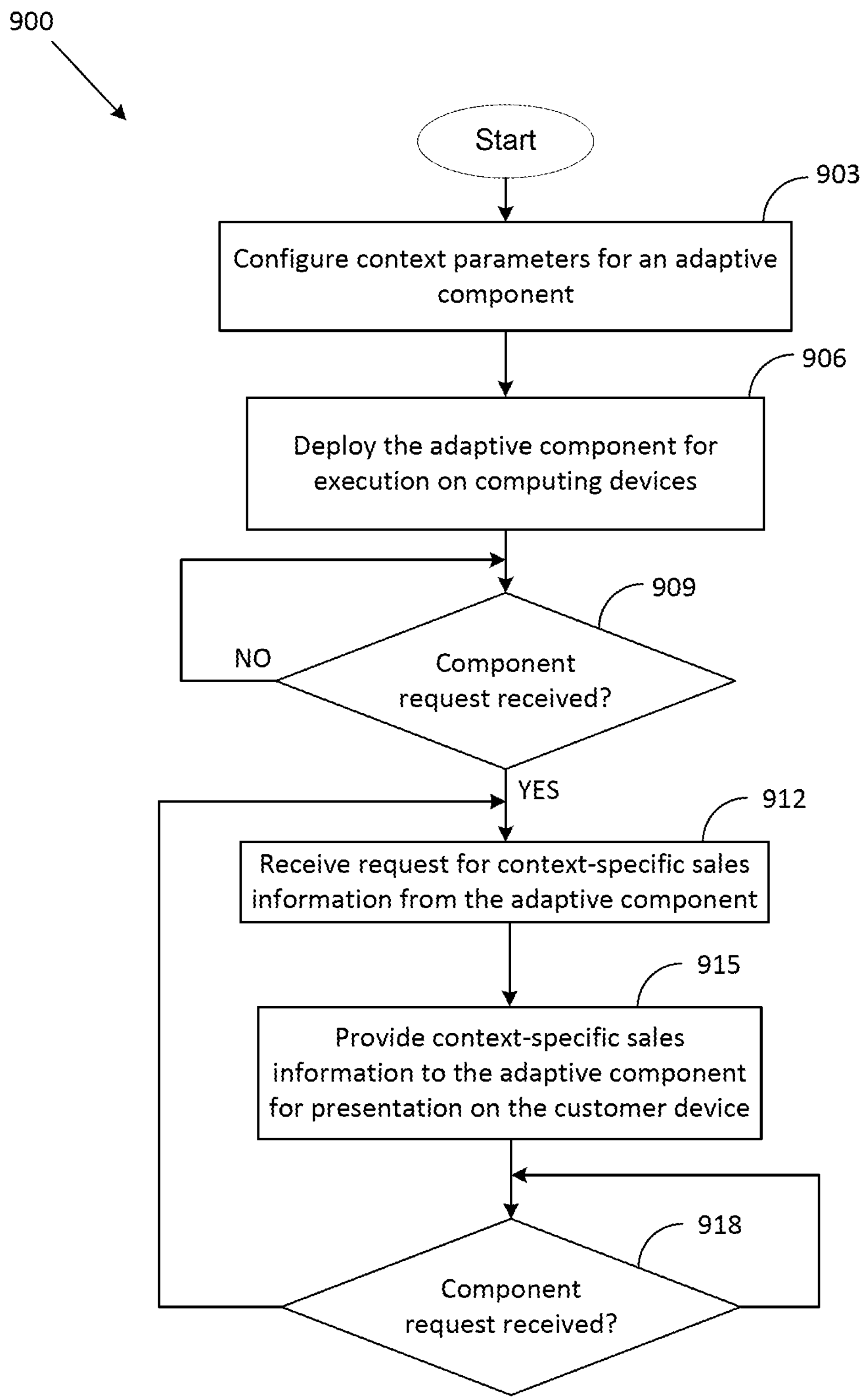
FIG. 9 is a flowchart illustrating one example of a method of using an adaptive component.

Referring next to FIG. 9, shown is a flowchart illustrating one example of a method 900 of using an adaptive component. The method 900 is initiated in response to a request to configure an adaptive component for use in a computing device.

In block 903, context parameters for an adaptive component are configured. This can involve a developer or vendor using an interface to select or otherwise configure parameters for the adaptive component. Various types of adaptive components can be used. Examples of adaptive components include, but are not limited to, product information components, wish list components, product comparison components, virtual shopping cart components, search components, and customer help components. The adaptive component provides context-specific content based on various types of information indicative of where the customer is in the shopping cycle. The parameters configure how the adaptive components respond and the types of content presented based on the identified context. For example, the context can be based on historical activities of the customer that relate to a given item, customer locations, type of computing device being used, etc.

In one embodiment, the adaptive component is configured by specifying context criteria, shopping journey categories, a customer interface layout, preferences, responsive actions, and/or other possible parameter types. For example, the developer may specify that a smart list should attempt to obtain current pricing and inventory levels for a vendor store that is closest to the current location of the customer device. As another example, the vendor that offers the adaptive component can specify a different layout of the customer interface that includes displaying particular components.

Next, in block 906, once the adaptive component is configured with parameters, the adaptive component is deployed for use in various computing devices. Then, in block 909, the method 900 determines if any requests have been received from the deployed adaptive components. If not, execution of the method 900 returns to block 909 to await such requests. Alternatively, in block 912, the method 900 receives a request for context-specific item information (also referred to as "sales information") identified by the adaptive component. In some implementations, some or all of the item information is retrieved from a vendor. In other implementations, prior to a request for context-specific item information, the adaptive component synchronizes a list of items and associated historical context (i.e. as may be produced from other computing devices of the customer).

Subsequently, in block 915, the method 900 provides the requested context-specific item information to the adaptive component, which can include data retrieved from the vendor device. In some implementations, any changes to a list of items presented by the adaptive components, as well as any contextual data (e.g. searching for an item, requesting item descriptions, etc.) is provided to and stored, where it may be accessible to other computing devices associated with the customer. Then, in block 918, the method 900 determines if additional requests have been received from the deployed adaptive components. If not, execution returns to block 918 to await further requests. Alternatively, if requests were received from the adaptive components, execution of the method 900 returns to block 912.

Exemplary Computing Environment

Figure 10:
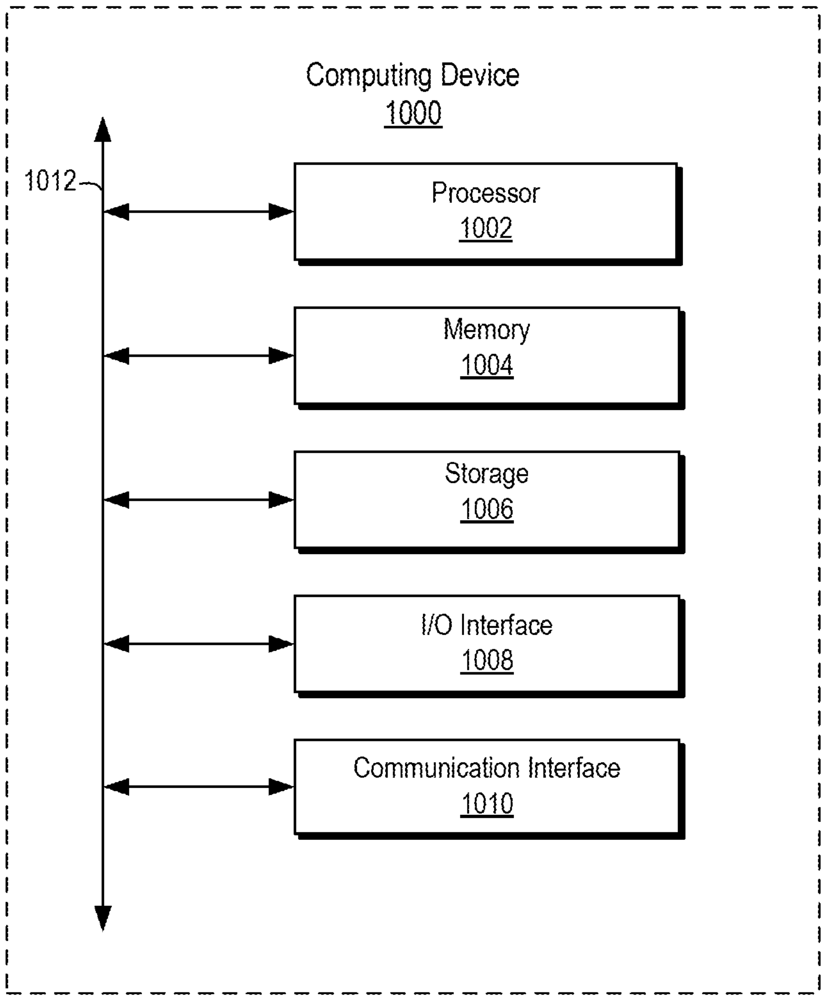
FIG. 10 is a schematic block diagram that provides one example illustration of the individual computing devices employed in the networked environment of FIG. 1.

Any suitable computing system or group of computing systems can be used to implement the techniques and methods disclosed herein. For example, FIG. 10 is a block diagram depicting examples of implementations of such components. The computing device 1000 can include a processor 1002 that is communicatively coupled to a memory 1004 and that executes computer-executable program code and/or accesses information stored in memory 1004 or storage 1006. The processor 1002 may comprise a microprocessor, an application-specific integrated circuit ("ASIC"), a state machine, or other processing device. The processor 1002 can include one processing device or more than one processing device. Such a processor can include or may be in communication with a computer-readable medium storing instructions that, when executed by the processor 1002, cause the processor to perform the operations described herein.

The memory 1004 and storage 1006 can include any suitable non-transitory computer-readable medium. The computer-readable medium can include any electronic, optical, magnetic, or other storage device capable of providing a processor with computer-readable instructions or other program code. Non-limiting examples of a computer-readable medium include a magnetic disk, memory chip, ROM, RAM, an ASIC, a configured processor, optical storage, magnetic tape or other magnetic storage, or any other medium from which a computer processor can read instructions. The instructions may include processor-specific instructions generated by a compiler and/or an interpreter from code written in any suitable computer-programming language, including, for example, C, C++, C#, Visual Basic, Java, Python, Perl, JavaScript, and ActionScript.

The computing device 1000 may also comprise a number of external or internal devices such as input or output devices. For example, the computing device is shown with an input/output ("I/O") interface 1008 that can receive input from input devices or provide output to output devices. A communication interface 1010 may also be included in the computing device 1000 and can include any device or group of devices suitable for establishing a wired or wireless data connection to one or more data networks. Non-limiting examples of the communication interface 1010 include an Ethernet network adapter, a modem, and/or the like. The computing device 1000 can transmit messages as electronic or optical signals via the communication interface 1010. A bus 1012 can also be included to communicatively couple one or more components of the computing device 1000.

The computing device 1000 can execute program code that configures the processor 1002 to perform one or more of the operations described above. The program code can include one or more modules. The program code may be resident in the memory 1004, storage 1006, or any suitable computer-readable medium and may be executed by the processor 1002 or any other suitable processor. In some embodiments, modules can be resident in the memory 1004. In additional or alternative embodiments, one or more modules can be resident in a memory that is accessible via a data network, such as a memory accessible to a cloud service.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure the claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

Therefore, the following, is claimed:

1. A computer-implemented method for providing vendor-specific information using an adaptive component comprising a smart list that is sharable with multiple vendors, the method comprising:

receiving, by a customer device, input from a customer to add, to the smart list, items identified by the customer that the customer is considering acquiring, wherein the smart list comprises electronic content that is configurable with parameters to receive and present information from a back-end service;

detecting, by the customer device, a context of a shopping experience of the customer, the context comprising a classification of an interest of the customer in a product based upon at least one indicator of interest;

receiving, by the customer device, input from the customer to share the smart list with a selected vendor, wherein the smart list is shareable with the multiple vendors;

in response to receiving the input to share the smart list, sending, by the customer device via a network, the smart list and the context to a vendor device of the selected vendor;

receiving, by the customer device from the vendor device via the network, the vendor-specific information corresponding to an item identified in the smart list that the customer is considering acquiring, wherein the vendor-specific information is identified by the vendor device using the smart list and the context; and adapting, by the customer device and with the adaptive component, the vendor-specific information based on a device type of the customer device or capabilities of the customer device.

2. The method of claim 1 further comprising determining the vendor-specific information corresponding to the item of the smart list, wherein the determining comprises:

identifying a type of the item of the smart list, wherein the item does not identify a brand of the selected vendor;

determining a brand of the item offered by the selected vendor; and determining product information regarding the brand of the item offered by the selected vendor as the vendor-specific information.

3. The method of claim 1 further comprising determining the vendor-specific information corresponding to the item of the smart list, wherein the determining comprises:

identifying customer information maintained by the selected vendor; and determining the vendor-specific information to provide based on the item and the customer information.

4. The method of claim 1, further comprising:

sharing, from the customer device to the vendor device, the smart list and information identifying that the customer device is physically located in a store of the selected vendor; and displaying the vendor-specific information on the customer device while the customer is physically located in the store of the vendor, wherein the vendor-specific information comprises context specific information determined based on the customer being physically located in the store of the vendor.

5. The method of claim 1, further comprising:

sharing, from the customer device to the vendor device, the smart list and information identifying that the customer device is physically located in a store of the selected vendor; and displaying the vendor-specific information on a vendor in-store device while the customer is physically located in the store of the selected vendor, wherein the vendor-specific information comprises context specific information determined based on the customer being physically located in the store of the selected vendor.

6. The method of claim 1, further comprising:

sharing, from the customer device to the vendor device, the smart list and information identifying that the customer device is physically located in a store of the selected vendor; and displaying the vendor-specific information on a vendor in-store device to vendor personnel while the customer is physically located in the store of the vendor, wherein the vendor-specific information comprises information identified to assist the vendor personnel provide assistance to the customer in the store of the vendor.

7. The method of claim 1, wherein the smart list is a plugin executed within a vendor website, the vendor website displaying the vendor-specific information.

8. The method of claim 1, wherein the smart list is a plugin executed within a vendor application, the vendor application displaying the vendor-specific information.

9. The method of claim 1, wherein the smart list comprises private customer information and sharable customer information, wherein sharing the smart list comprises sharing the sharable customer information without sharing the private customer information with the selected vendor.

10. The method of claim 9, wherein the private customer information comprises a clothing size of the item.

11. The method of claim 1, wherein the smart list was created for the customer during a prior visit by the customer to a vendor independent of the multiple vendors.

12. The method of claim 1, wherein the smart list was created for the customer during a prior visit by the customer to another vendor.

13. The method of claim 1 further comprising:

receiving input to add or remove an item from the smart list; and modifying the smart list based on the input to add or remove the item.

14. The method of claim 1, further comprising modifying the smart list based on receiving a modification to the smart list from a third party authorized by the customer.

15. A system comprising:

a processor;

a non-transitory computer-readable medium comprising instructions that include an adaptive component, wherein when executed by the processor the instructions perform operations comprising:

receiving input from a customer to add, to the smart list, items identified by the customer that the customer is considering acquiring, wherein the smart list comprises electronic content that is configurable with parameters to receive and present information from a back-end service;

detecting a context of a shopping experience of the customer, the context comprising a classification of an interest of the customer in a product based upon at least one indicator of interest;

receiving input from the customer to share the smart list with a selected vendor, wherein the smart list is shareable with multiple vendors;

in response to receiving the input to share the smart list, sending, via a network, the smart list and the context to a vendor device of the selected vendor; and receiving, from the vendor device via the network, vendor-specific information corresponding to an item identified in the smart list that the customer is considering acquiring, wherein the vendor-specific information is identified by the vendor device using the smart list and the context; and adapting the vendor-specific information based on a device type of the system or capabilities of the system.

16. The system of claim 15, the operations further comprising determining the vendor-specific information corresponding to the item of the smart list, wherein the determining comprises:

identifying a type of the item of the smart list, wherein the item does not identify a brand of the selected vendor;

determining a brand of the item offered by the selected vendor; and determining product information regarding the brand of the item offered by the selected vendor as the vendor-specific information.

* * * * *